US011917359B2

(12) United States Patent
D'Ascanio et al.

(10) Patent No.: US 11,917,359 B2
(45) Date of Patent: Feb. 27, 2024

(54) FIR CABLE LOOP SPEAKERS SYSTEM

(71) Applicants: Franco L D'Ascanio, Key Colony Beach, FL (US); Sean P Snowden, Marathon, FL (US); Harold M. Zimmermann, Riverton, NJ (US)

(72) Inventors: Franco L D'Ascanio, Key Colony Beach, FL (US); Sean P Snowden, Marathon, FL (US); Harold M. Zimmermann, Riverton, NJ (US)

(73) Assignee: COASTAL SOURCE, LLC, Marathon, FL (US)

( * ) Notice: Subject to any disclaimer, the term of this patent is extended or adjusted under 35 U.S.C. 154(b) by 0 days.

(21) Appl. No.: 18/350,112

(22) Filed: Jul. 11, 2023

(65) Prior Publication Data

US 2024/0031732 A1 Jan. 25, 2024

Related U.S. Application Data

(60) Provisional application No. 63/390,427, filed on Jul. 19, 2022.

(51) Int. Cl.
*H04R 1/22* (2006.01)
*H04R 3/12* (2006.01)

(52) U.S. Cl.
CPC ................ *H04R 1/22* (2013.01); *H04R 3/12* (2013.01)

(58) Field of Classification Search
None
See application file for complete search history.

(56) References Cited

U.S. PATENT DOCUMENTS 7,492,912 B2 * 2/2009 Chung .................... H04R 5/04 381/59
10,469,949 B1 * 11/2019 Wiersum ................ H04R 3/12

OTHER PUBLICATIONS

Canberk Koksal, "Wiring 4 Speakers to a 2-Channel Amp", (https://www.soundton.com/wiring-4-speakers-to-a-2-channel-amp/), Jun. 9, 2022 (Year: 2022).*
Kieran Gunessee, "How to Wire Speakers in Parallel & Series, and how does it affect Impedance?", (https://audiovolt.co.uk/blogs/av-insight-background-audio-advise/how-to-wire-speakers-in-parallel-series-and-how-does-it-affect-impedance/), Jul. 27, 2021 ( Year: 2021).*

* cited by examiner

*Primary Examiner* — Paul W Huber
(74) *Attorney, Agent, or Firm* — Stuart M. Goldstein

(57) ABSTRACT

A feeder/interconnection/return (FIR) Cable Loop System vastly improves the distribution, equalization, efficiency and power delivery of high performance multiple speaker systems, without the complexities and inherent inefficiencies of existing systems. This is achieved by a feeder cable which connects from an amplifier to the first speaker, while interconnecting cables connect all the speakers to each other. A return cable connects the last speaker back to the amplifier. This results in balanced power, significant improvement in frequency response, and dynamic range.

4 Claims, 5 Drawing Sheets

FIR CABLE LOOP SPEAKERS SYSTEM

RELATED APPLICATION

The application claims the benefit of provisional application 63/390,427, filed on Jul. 19, 2022.

FIELD OF THE INVENTION

The present invention relates to audio systems, and particularly to a cable loop speaker system which improves balanced power delivery to systems with multiple audio speakers.

BACKGROUND OF THE INVENTION

Through extensive research and testing, it has been revealed that there is a restoration of frequency response and dynamic range that does not occur with industry standard "dead-end" wiring. The industry standard, i.e. distributed audio cabling systems, are one-way dead end and constant voltage configurations. Examples of such systems are depicted in FIGS. 1 and 3. The systems show various one-way dead end connections 1 and 11 connected between amplifiers 2 and 12 and speakers 3, 4, 5, and 6 and 13, 14, 15, 16, and 17, respectively. These systems have significant limitations.

For instance, although one-way dead-end cabling systems deliver the highest level of fidelity to the first speaker, the performance is degraded to each subsequent speaker thereafter. In addition, since the power and performance of each speaker varies, sophisticated DSP equalization (digital signal processing) is used, but cannot properly correct the differences between all speakers. This results in a different acoustic experience in each of the speakers' coverage areas.

This has not been recognized in the industry due to the acceptance of 70V versus the perception that long cable runs increase capacitance, reduce inductance, and incur attendant increases in costs. The industry standard is to keep cables as short as possible, since cables overall can only do harm to the signal integrity as passive electrical characteristics degrade performance. Thus, shorter cables are always considered to be better, but in many cases, long or very long cables are required.

SUMMARY OF THE INVENTION

It is thus the object of the present invention to provide a feeder/interconnect/return (FIR) Cable Loop System which vastly improves the distribution, equalization, efficiency and power delivery of high performance multiple speaker systems, without the complexities and inherent inefficiencies of existing systems. A uniconnect system further simplifies the cabling system and installation.

These objectives are accomplished by the present invention, a cable loop system that significantly improves signal distribution, equalization, and power delivery for high performance audio systems, resulting in high-efficiency balanced power distribution, significant improvement in frequency response, and dynamic range. Equalization can be optimized for all speakers simultaneously versus optimizing one speaker, or an average across all speakers as in conventional multi-speaker audio systems.

These results are achieved by an audio connection FIR Cable Loop system consisting of amplification and one or more speaker systems electrically connected in a series, parallel, or series/parallel configuration. A feeder cable from the amplifier connects to the first speaker, while interconnecting cables connect all the speakers to each other. A return cable connects the last speaker back to the amplifier. This results in balanced power, significant improvement in frequency response, and dynamic range. It eliminates redundancy from cuts and connection issues, since power to the speakers is fed from both ends. This makes troubleshooting easier by enabling the repair technician to immediately identify the exact point of failure.

In the FIR loop system, there is lower resistance due to a higher current carrying capacity, resulting in a lower voltage drop and more power delivered to each speaker. The FIR loop system's interaction of inductance, capacitance, and resistance counteract a significant number of negatives in long speaker runs with multiple speakers. In line inductance is reduced by 50% due to connections of the feeder and return cables, resulting in significant frequency response and dynamic range improvement. In addition, equalization can be optimized for all speakers verses just one or averaged across all speakers in conventional systems. The wire gauge, geometry, and conductor type may be mixed and matched in each of the three (3) cables sections (feeder/interconnect/return) to optimize the FIR system for various types of components and configurations allowing for optimal performance of the FIR system.

The FIR loop system of the present invention also serves a similar purpose to 70V high impedance system, without the added cost and complexity of transformers, switches, and their significant signal degradation in performance. It is noted that 70V and similar systems can be useful for background systems, but they are not useful for Hi-Fi performance systems. They are also impractical for Bi-amp and Trip-amp stereo systems that would require up to four times as many large and expensive, lossy transformers. The FIR loop system is optimized for large speaker installations.

The advantages of the present invention are further assisted and accomplished by a single cable uniconnect system that connects multiple discrete channels, such as stereo, biamp, tri-amp, or surround systems, physically in a series fashion, and parallel or series in an electrical fashion. This is a plug-n-play system which utilizes the single cable (heavy gauge, low resistant multi-conductor/multi-channel) to correctly feed a loop that connects all speakers regardless of the type or channel designation. The system also advantageously has low resistance high contact area connections which contribute to FIR loop system restorative benefits. The significant reduction in the number of connections also contributes to the FIR system's restorative benefits. The FIR cable system uses more cable, but its restorative properties more than overcome the cables' passive electrical characteristics that are detrimental to other cabling configurations.

In addition, the system has a built-in LCR filter circuit (inductance, capacitance, resistance). Many audiophile grade cables trade higher capacitance for lower inductance. The FIR loop cable system accomplishes the same goals without the significant cost of exotic materials, winding geometry, or additional active and/or passive electrical components.

Just as important, based on the amplifier's ability to read cable parameters such as inductance, capacitance, and total resistance/impedance, the amplifier can work with the FIR loop system, since all speakers are balanced in output regardless of where they are located in the electrical circuit. Auto EQ does not work well with dead end cable systems.

The simplicity of this configuration greatly reduces the number of connections by a factor of 8 (Tri-amp system with 12 Sats and 4 Subs). It eliminates the difficult industry standard of making reliable and sustainable manual in-field connections. The system designer and/or operator/installer does not need to know that audio channel connections are being made or why. Thus, the required skill and technical level of installing high tech systems is greatly reduced, while also becoming very cost effective.

The direct connections to each speaker with an input and output results in a shorter cable distance. This also eliminates the possibility of mixing up audio channels, polarity inversion, and short circuits. The system is highly efficient and, as discussed above, drastically reduces the installation labor and skill level, as well as installation error, and required installation time. Significantly, no special certifications or licensing is required to install the FIR loop system, whereas 70V systems are in many areas considered high voltage by electrical codes. This requires installation by a licensed/certified high voltage electrical contractor, which is another inherent disadvantage.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
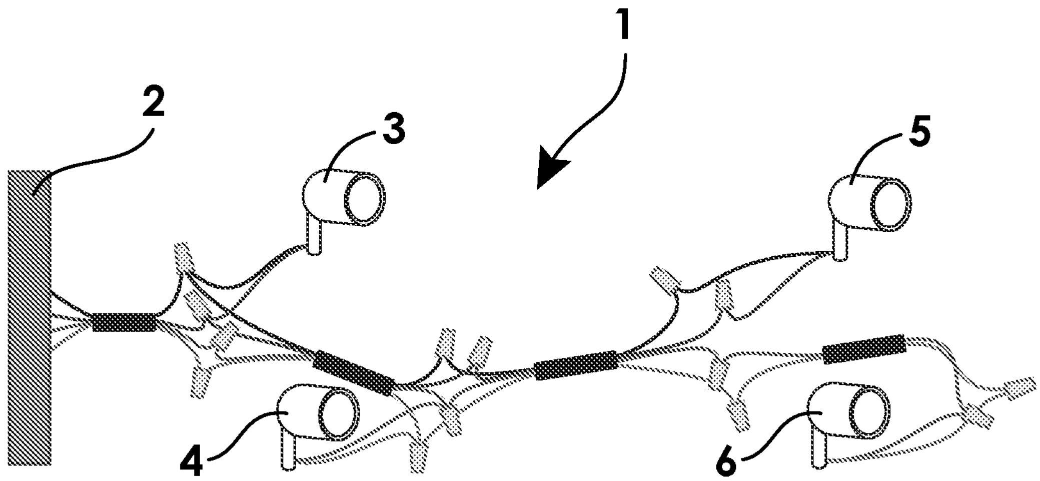
FIG. 1 illustrates an industry, standard, dead-end cabling configuration for a stereo system.
Figure 2:
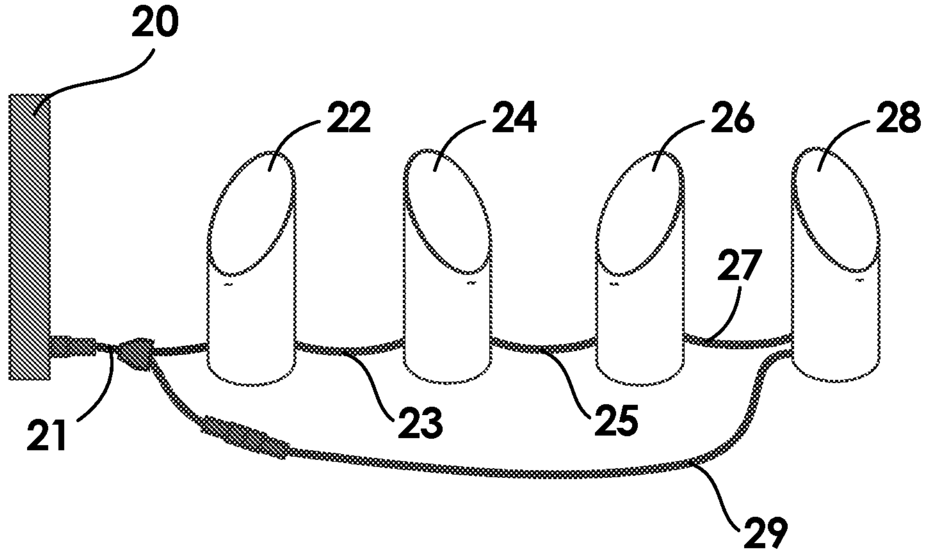
FIG. 2 shows the FIR loop system of the present invention used in a stereo system. The single return cable between the amplifier and the furthest speaker from the amplifier, which completes the cable loop, is clearly shown in the FIG.
Figure 3:
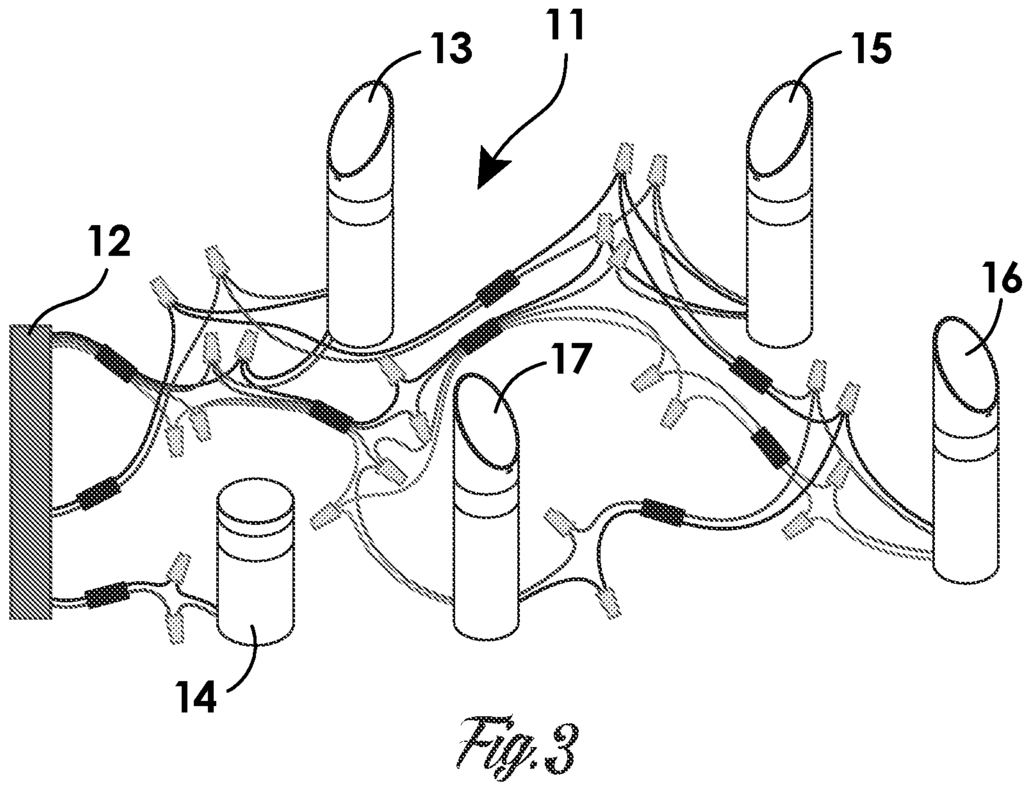
FIG. 3 illustrates an industry, standard, dead-end cabling configuration for a Tri-amp stereo system.

The present invention is illustrated in FIG. 2 showing the FIR loop system utilized in a stereo system. Electrical feeder cable 21 is connected directly between amplifier 20 and first speaker 22 in the system. First interconnecting electrical cable 23 is connected directly between first speaker 22 and second speaker 24. Second interconnecting electrical cable 25 is connected directly between second speaker 24 and third speaker 26. Third interconnecting electrical cable 27 is connected directly between third speaker 26 and fourth speaker 28. Return electrical cable 29 is connected between fourth speaker 28 and amplifier 20. By this configuration, the electrical power to each of the speakers is balanced, resulting in enhanced signal distribution and power delivery to and acoustical equalization of the speakers.

Figure 4:
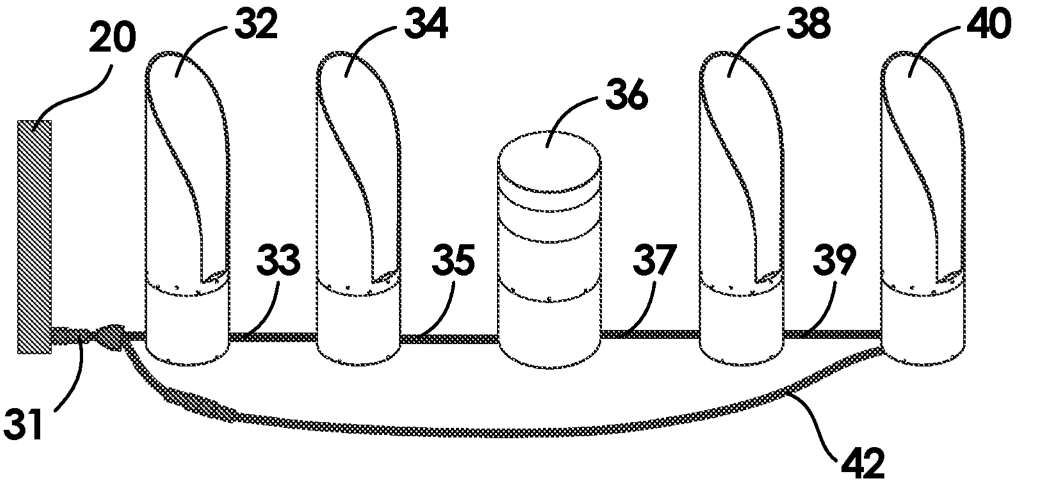
FIG. 4 shows the FIR loop system of the present invention used in a Tri-amp stereo system. The single return cable between the amplifier and the furthest speaker from the amplifier, which completes the cable loop, is clearly shown in the FIG.

An alternate FIR loop system is illustrated in FIG. 4, in which the system is used in a Tri-amp stereo system. Electrical feed cable 31 is connected directly between amplifier 20 and first speaker 32 in the system. First interconnecting electrical cable 33 is connected directly between first speaker 32 and second interconnecting electrical cable 33 is connected directly between second speaker 34 and third speaker 36. Third interconnecting electrical cable 37 is connected directly between third speaker 36 and fourth speaker 38. Fourth interconnecting electrical cable 39 is connected directly between fourth speaker 28 and fifth speaker 40. Return electrical cable 42 is connected between fifth speaker 40 and amplifier 20. By this configuration, the electrical power to each of the speakers is balanced, resulting in enhanced signal distribution and power delivery to and acoustical equalization of the speakers.

The systems shown in FIGS. 2 and 4 are merely examples of the manner in which the FIR Cable Loop System of the present invention can be connected to and between different types of speakers. However, the present invention is not to be considered restricted to these system examples. It is contemplated that the FIR Cable Loop System can be utilized with any number and types of speakers.

Figure 5:
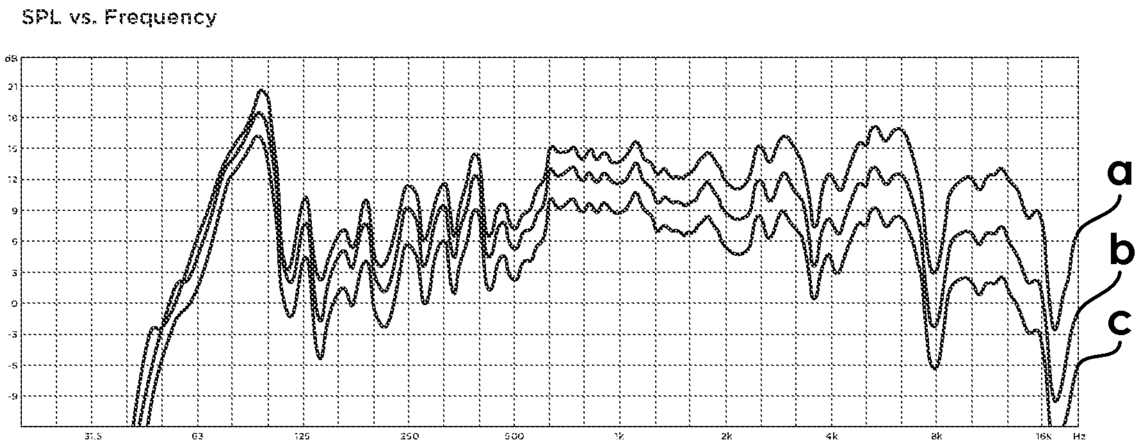
FIG. 5 is a graphical illustration of SPL vs Frequency of four non-looped speakers.

The graphic charts in FIGS. 5-7*a* provide comparisons between the FIR Cable Loop of the present invention and comparable dead-end systems. With specific reference to FIG. 5, sound pressure levels (SPL) are measured versus frequency. The chart shows control speaker output a with a ten foot cable length (13 dB @10 kHz), fourth speaker output of the FIR Cable Loop b with 275 foot of cable plus return cable (7 dB @ 10 kHz), and fourth speaker output c with 275 foot of dead-cable (2 dB @ 10 kHz). As is depicted in FIG. 5, at roughly 10 kHz, output b measures 6 decibels lower than control a, while output c measures 11 decibels lower than the control. This confirms a 5 decibel increase in volume when the same audio system implements a return cable.

Figure 6:
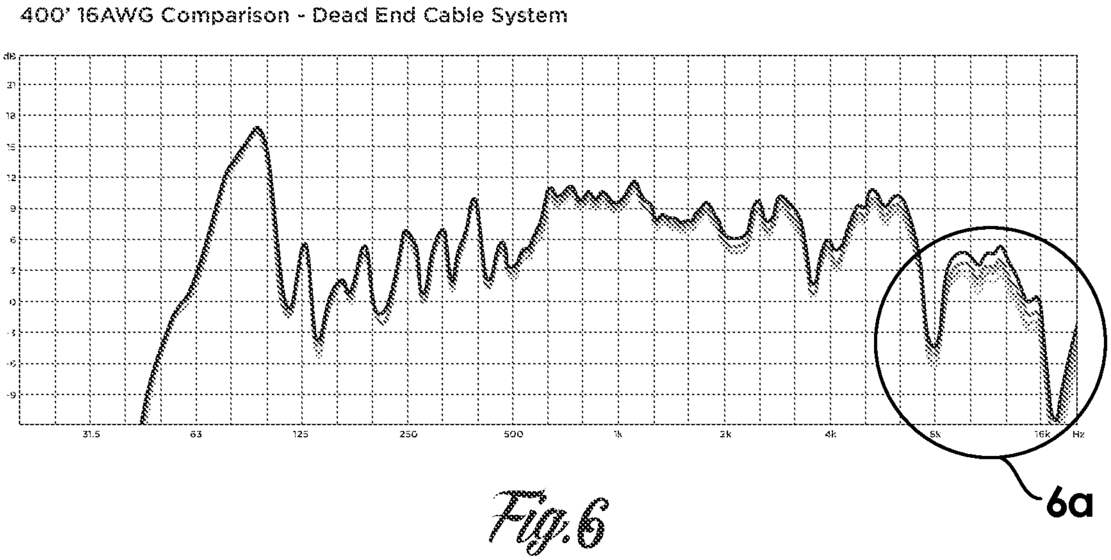
FIG. 6 is a graphical illustration of a dead end cable system.
Figure 6A:
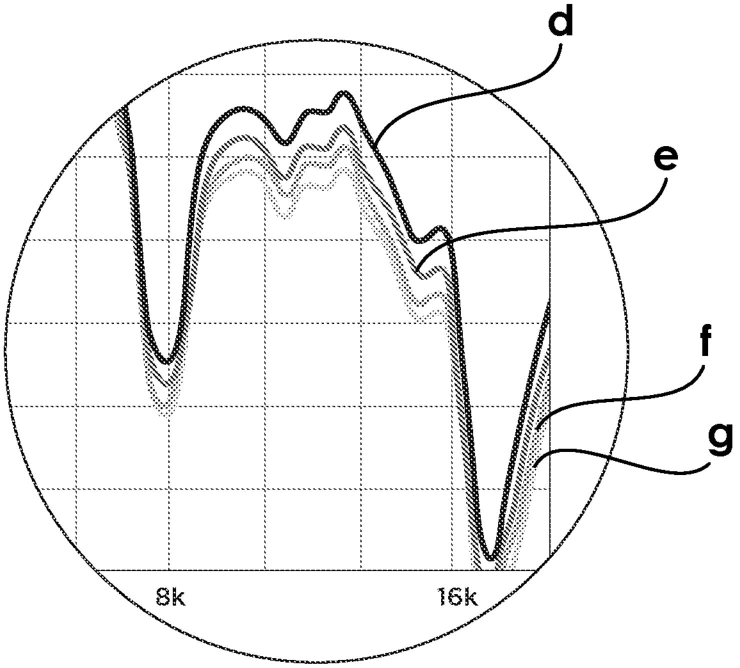
FIG. 6*a* is an enlarged sectional view taken from FIG. 6.

FIGS. 6 and 6*a* shows a 400 foot 16 AWG comparison of dead-end cable systems. The chart compares first speaker d with 200 foot of dead-end cable (5 dB @ 10 kHz), second speaker e with 225 foot of dead-end cable (3.5 dB @ 10 kHz), third speaker f with 250 foot of dead-end cable (3.0 dB @10 kHz), and fourth speaker g with 275 foot of dead-end cable (2.5 dB @ 10 kHz). In a dead-end cable audio system, there is apparent power and frequency degradation as the speakers get further away from the amplifier. This variation equates to an inconsistent reproduction of sound and a compromised listening experience.

Figure 7:
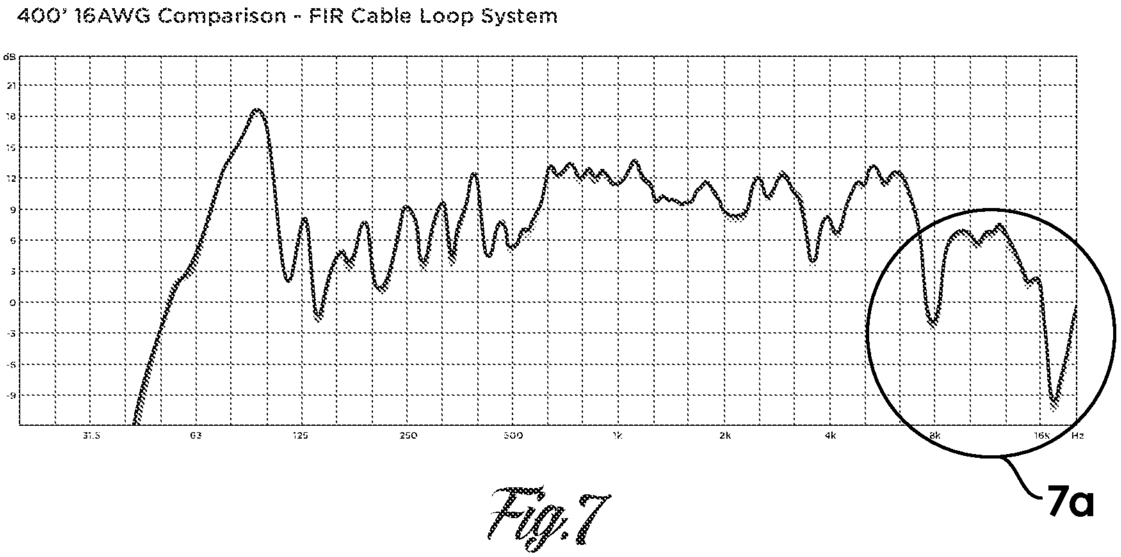
FIG. 7 is a graphical illustration of four looped speakers utilizing the cable loop FIR/Uniconnect speaker system of the present invention.
Figure 7A:
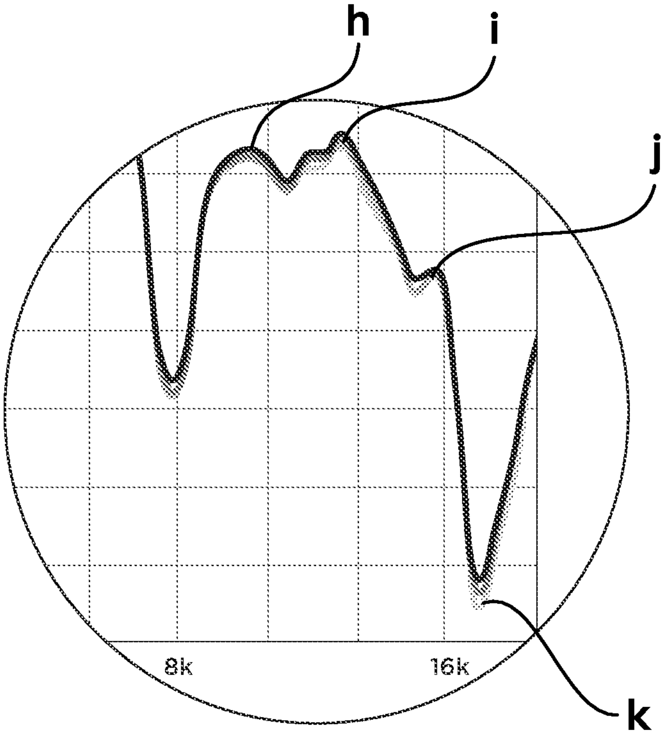
FIG. 7*a* is an enlarged sectional view taken from FIG. 7.

On the other hand, the charts in FIGS. 7 and 7*a* provide a stark comparison of the dead-end cable systems shown in FIG. 6 with the FIR Cable Loop System. The chart shows first speaker h with 200 foot of cable (7 dB @ 10 kHz), second speaker i with 225 foot of cable (6.5 dB @ 10 kHz), third speaker j with 250 foot of cable (6.5 dB @ 10 kHz), and fourth speaker k with 275 foot of cable (7 dB @ 10 kHz). In the FIR Cable Loop System, there is hardly any loss in power or frequency between speakers. In this case, there is only a 0.5 dB loss at the two middle speaker locations, which is not appreciable to the listener.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A multiple speaker, cable loop system for improving the distribution and power delivery to and equalization of a speaker system, said cable loop system comprising:

an amplifier;

an electrical feeder cable connected at a first end to the amplifier and extending and connected at a second end directly to a first speaker, said feeder cable having a connective junction located between the first and second ends of the feeder cable;

a first interconnecting electrical cable connected directly between the first speaker and a second speaker; and a return electrical cable connected directly between the second speaker and the connective junction on the feeder cable, wherein power to each speaker is balanced, resulting in enhanced signal distribution and power delivery to and acoustical equalization of both the first and second speakers.

2. The speaker cable loop system as in claim 1 wherein a second interconnecting electrical cable is connected directly between the second speaker and a third speaker, and the return electric cable is connected directly between the third speaker and the amplifier.

3. The speaker cable loop system as in claim 1 wherein a second interconnecting cable is connected directly between the second speaker and a plurality of additional speakers, each of the plurality of additional speakers being connected in series directly to a contiguous speaker by interconnecting cables, the return cable being connected directly between the last speaker in the series of the plurality of additional speakers and the amplifier.

4. A multiple speaker, cable loop system for improving the distribution and power delivering to and equalization of a speaker system, said cable loop system, comprising:

an amplifier;

an electrical feeder cable connected at a first end to the amplifier and extending and connected at a second end directly to a first speaker, said feeder cable having a connective junction located between the first and second ends of the feeder cable;

a first interconnecting electrical cable connected directly between the first speaker and a plurality of additional speakers, each of the plurality of additional speakers being connected in series directly to a contiguous speaker by interconnecting cables; and a return cable being connected directly between the last speaker in the series of the plurality of additional speakers and the connective junction on the feeder cable, wherein power to each speaker is balanced, resulting in enhanced signal distribution and power delivery to and acoustical equalization of the speakers.

* * * * *